(12) United States Patent
Wilkerson et al.

(10) Patent No.: US 9,829,018 B2
(45) Date of Patent: Nov. 28, 2017

(54) NON-CYLINDRICAL FASTENING SYSTEMS AND RELATED METHODS

(71) Applicant: The Boeing Company, Huntington Beach, CA (US)

(72) Inventors: Jeffrey Alan Wilkerson, Everett, WA (US); Randy Allan Southmayd, Florissant, MO (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 14/637,206

(22) Filed: Mar. 3, 2015

(65) Prior Publication Data

US 2016/0258459 A1    Sep. 8, 2016

(51) Int. Cl.
  *F16B 5/02*    (2006.01)
  *F16B 35/04*   (2006.01)
  *F16B 33/00*   (2006.01)

(52) U.S. Cl.
  CPC .............. *F16B 5/02* (2013.01); *F16B 33/002* (2013.01); *F16B 35/041* (2013.01)

(58) Field of Classification Search
  CPC ......... F16B 35/041; F16B 35/048; F16B 5/02
  USPC ......................................... 411/424, 417, 418
  See application file for complete search history.

(56) References Cited

U.S. PATENT DOCUMENTS

| | | | |
|---|---|---|---|
| 1,335,613 A * | 3/1920 | Selle | F16B 35/041 411/368 |
| 1,822,657 A | 9/1931 | Horton | |
| 2,244,976 A | 6/1941 | Tinnerman | |
| 2,531,351 A | 11/1950 | Churchill | |
| 2,695,435 A | 11/1954 | Bedford, Jr. | |
| 2,866,372 A | 12/1958 | Fisher | |
| 3,599,692 A | 8/1971 | Holmes | |

(Continued)

FOREIGN PATENT DOCUMENTS

RU    1812351    4/1993

OTHER PUBLICATIONS

Machine-generated English translation of a description of RU 1812351 as downloaded from espacenet.com on Feb. 23, 2015.

*Primary Examiner* — Flemming Saether
(74) *Attorney, Agent, or Firm* — Dascenzo Intellectual Property Law, P.C.

(57) ABSTRACT

The present disclosure relates to non-cylindrical fastening systems and related methods, such as methods of installing a non-cylindrical fastening system. Presently disclosed non-cylindrical fastening systems may include a first fastening component and a second fastening component, where the second fastening component includes an elongate shank configured to be inserted through a hole in the first fastening component and through a hole in a structure to which the first fastening component is being secured. The holes in the first fastening component and the structure may be non-circular, and the elongate shank may be non-circular in perpendicular cross-section. Disclosed fastening systems may also include a third fastening component configured to be installed onto the elongate shank, and substantially prevent axial movement of the elongate shank with respect to the structure and/or first fastening component. Such fastening systems may lower the number of parts required in manufacturing an apparatus, such as an aircraft.

20 Claims, 7 Drawing Sheets

(56) References Cited

U.S. PATENT DOCUMENTS

| | | | | |
|---|---|---|---|---|
| 3,855,895 | A | * | 12/1974 | Francis, Jr. ............ F16B 35/041 |
| | | | | 411/337 |
| 4,014,245 | A | | 3/1977 | Frye et al. |
| 4,235,560 | A | * | 11/1980 | Schimmel ............. E04G 17/042 |
| | | | | 403/343 |
| 4,854,114 | A | * | 8/1989 | Speck .................... A01D 34/13 |
| | | | | 411/169 |
| 5,411,154 | A | * | 5/1995 | Vargo ...................... F16B 12/30 |
| | | | | 211/189 |
| 5,421,557 | A | * | 6/1995 | Vise ...................... E04H 17/003 |
| | | | | 248/74.5 |
| 5,492,446 | A | * | 2/1996 | Hawkins ............... F01D 17/162 |
| | | | | 411/116 |
| 6,821,070 | B1 | | 11/2004 | Thompson |
| 7,814,735 | B2 | * | 10/2010 | Neudorf ............... A01D 34/733 |
| | | | | 411/399 |
| 7,934,896 | B2 | | 5/2011 | Schnier |
| 2004/0094681 | A1 | * | 5/2004 | Birnbaum ................ F16L 3/24 |
| | | | | 248/300 |
| 2005/0183260 | A1 | | 8/2005 | Meyer |
| 2014/0283363 | A1 | | 9/2014 | Wilkerson et al. |

\* cited by examiner

NON-CYLINDRICAL FASTENING SYSTEMS AND RELATED METHODS

FIELD

The present disclosure relates to non-cylindrical fastening systems and related methods, such as methods of installing a non-cylindrical fastening system.

BACKGROUND

In manufacturing objects, structures are often connected to each other. For example, in manufacturing an object, such as an aircraft, many different structures are connected to each other to form assemblies for systems in the aircraft. For example, skin panels may be attached to ribs and spars. As another example, floor panels may be connected to support structures in a fuselage to form the floor of a passenger cabin. In connecting structures to each other, different types of connecting systems may be used. One type of connecting system is a fastener system. A fastener system may include one or more fasteners. For example, a fastener for a fastener system may be a screw, a pin, a bolt, and/or a nut.

These fasteners may be used to connect structures to each other. For example, holes may be formed in the structure and nuts and bolts may be installed relative to the holes. Depending on the structures being coupled together and/or the type of fastener system being used, one or more nut plates, brackets, or clips may be utilized in the fastener system. Often, construction of objects or structures such as aircraft requires installation of a large number of such fastener systems, with each hole drilled and part used adding incrementally to the overall cost of the object and/or to the time to manufacture it. Some such fastener systems may require that components be riveted into place on the structure. U.S. Patent Application Publication No. 2014/0283363 (Wilkerson, et al.), the entirety of which is incorporated herein for all purposes, discloses a rivetless anti-rotation nut plate that is designed to resist rotation without the use of rivets by virtue of a nut plate having a non-circular body end that is inserted into a non-circular hole. Such an arrangement allows for use of a conventional bolt having a circular cross-sectional area and a nut having a through-hole with a circular cross-sectional area as well. In other fastener systems involving installing one or more brackets or clips, two or more bolts may be required to sufficiently secure each bracket or clip so as to prevent rotation of the bracket or clip with respect to the structure to which it is attached, which may otherwise occur if the bracket or clip was installed using a single bolt. To keep two parts in the same relative positions using round holes and fasteners with circular cross-sectional areas, multiple conventional fasteners must be used (e.g., at least two) due to rotation about the central axis of the circular bolts and holes.

Carriage bolts have been used in some applications, where the carriage bolt's shank is circular for most of its length, but the portion immediately beneath the head is formed into a square section. Thus, carriage bolts may be self-locking when placed through a square hole. However, square holes are often not ideal for many industrial applications due to stresses and reduced fatigue properties created at sharp corners. Along the same lines, U.S. Pat. No. 1,822,657 (Horton) discloses a modified carriage bolt with a non-round shoulder portion (the portion of the shank's length that is immediately beneath the head of the bolt) having four flat surfaces and four cylindrical surfaces, which forms a shape that is a combination of a parallelogram and an ellipse. Both conventional carriage bolts and the modified bolt disclosed in Horton have limited applicability, typically being configured to prevent rotation of the bolt head to aid in installation of the nut. Other conventional fastening systems may be costly and/or complicated to manufacture, such as those including nuts having projecting tabs formed thereon or therein, an example of which is disclosed in U.S. Pat. No. 4,014,245 (Frye, et al.).

SUMMARY

Presently disclosed fastener systems (which also may be referred to herein as "fastening systems") may employ a non-round hole and a corresponding non-cylindrical fastener (e.g., a fastener having a shank with a cross-sectional area that is not circular). Such presently disclosed fastener systems may be used to install, for example, a bracket or a clip, with a single fastener, such fastener system being sufficient to prevent rotation of the bracket or clip despite only a single fastener being used. Prevention of rotation of the bracket or clip may be accomplished via the geometry of the fastener system, and may result in lower costs, part counts, and/or time required to manufacture an apparatus (such as an aircraft) that may require installation of a large number of such brackets or clips, with an incremental time and cost savings for each bracket or clip.

One example of a disclosed fastener system according to the present disclosure includes a first fastening component and a second fastening component that may be configured to be secured to a structure having a first hole formed therein. The first fastening component may include a second hole formed therethrough and the second fastening component may have an elongate shank. The elongate shank may be sized and shaped to be inserted through the second hole in the first fastening component and into the first hole in the structure, thereby securing the first fastening component to the structure such that the first fastening component is substantially not rotatable with respect to the structure, wherein the first hole and the second hole are not circular. The first hole and the second hole may be non-circular, and the elongate shank correspondingly may have a non-circular cross-section along at least a portion of the elongate shank. In some examples, the first fastening component may be a structural component, and the non-cylindrical elongate shank may be configured to prevent rotation of the structural component with respect to the structure.

The fastener system may also include a third fastening component having a third hole that is configured to be installed onto the elongate shank, thereby securing the second fastening component in an axial direction. In some examples, the elongate shank may include a portion having a circular cross-section, such that the third fastening component may be, for example, a conventional nut, or other standard attachment devices. Alternatively, in some examples, the third fastening component (e.g., a round nut or collar) may be swaged or otherwise secured to the non-circular portion of the elongate shank.

Related methods are also disclosed. One exemplary method may include providing a fastening system according to the present disclosure, positioning the first fastening component with respect to the structure such that the first hole in the structure is aligned with the second hole of the first fastening component, and inserting the elongate shank of the second fastening component into the first hole and the second hole, thereby coupling the first fastening component to the structure and substantially preventing rotation of the first fastening component with respect to the structure with a single second fastening component, as compared to conventional fastening systems which require at least two elongate shank components to prevent rotation of the other fastening component.

DESCRIPTION

Figure 1:
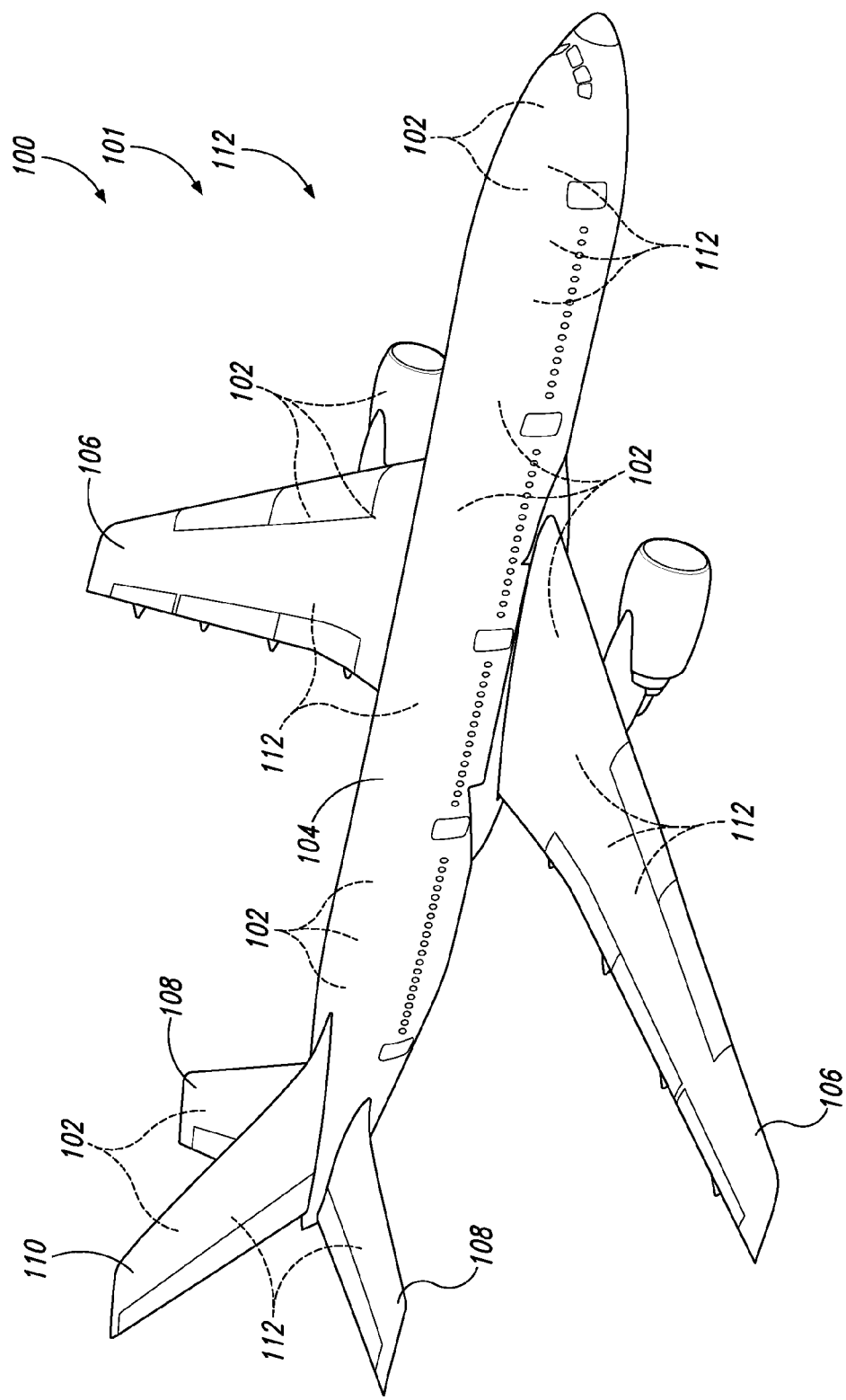
FIG. 1 is schematic diagram representing an aircraft including one or more fastening systems according to the present disclosure.

Non-cylindrical fastening systems and related methods are disclosed herein. In some examples, such non-cylindrical fastening systems and/or methods may be used in manufacturing an apparatus, such as apparatus 100, as schematically illustrated in FIG. 1. For example, apparatus 100 may include one or more non-cylindrical fastening systems 102 (which also may be referred to herein as fastening system 102 or fastener system 102). Exemplary fastening systems 102 may include brackets, clips, angles, standoffs, stringer clips, radius fillers, radius enhancements, radius blocks, and/or angled fillers, and components to attach the same to a structure 112, which may be, for example, apparatus 100 or a component or system thereof. In some examples, apparatus 100 may include hundreds, or even thousands, of fastening systems 102 at various locations. Use of presently disclosed non-cylindrical fastening systems in manufacturing an apparatus may, in some examples, reduce the number of fasteners required to manufacture the apparatus (as compared to the number of conventional fasteners that would be required), reduce the number of holes required to be drilled in manufacturing the apparatus (as compared to the number of holes that need to be drilled when conventional fastening systems are used), prevent rotation of one or more fastening components (e.g., the head portion of a bolt), and/or reduce fatigue penalties for inducing stress risers in the form of holes.

Apparatus 100 may be provided in the form of an aircraft 101; however, other apparatuses 100 are within the scope of the present disclosure, and the present disclosure is not limited to aircraft and aircraft applications. For example, as illustrative, non-exclusive examples, other apparatuses 100 that may be constructed with one or more fastener systems 102 according to the present disclosure include (but are not limited to) watercraft, land vehicles, monuments, furniture, land-based structures, aquatic structures, space-based structures, tanks, ships, personnel carriers, trains, spacecraft, aircraft, recreational vehicles, trucks, other vehicles, space stations, satellites, submarines, automobiles, power plants, bridges, dams, houses, manufacturing facilities, buildings, and/or any other structure or device that includes a fastening system. Additionally or alternatively, apparatus 100 may take the form of an assembly or subassembly within a larger apparatus. For example, apparatus 100 may take the form of a landing gear assembly, an engine, a wing, a wall, a fuselage, and/or any other component or subassembly of a larger apparatus. Apparatus 100 may take the form of systems or subsystems within a larger assembly, such as interiors, hydraulics, fuel systems, electrical systems, current return networks, and/or components thereof. Moreover, aircraft 101 may take any suitable form, including commercial aircraft, military aircraft, private aircraft, or any other suitable aircraft. While FIG. 1 illustrates aircraft 101 in the form of a fixed wing aircraft, other types and configurations of aircraft are within the scope of aircraft 101 according to the present disclosure, including (but not limited to) helicopters.

Aircraft 101 may include a fuselage 104, which also may be referred to herein as a barrel 104, and which generally corresponds to the main body of aircraft 101 for holding passengers, crew, cargo, and/or equipment, for example, depending on the particular configuration and/or function of an aircraft 101. Typically, although not required, fuselage 104 of an aircraft 101 is elongate and somewhat cylindrical or tubular. In some embodiments, fuselage 104 may be constructed of multiple sections that are longitudinally spaced along fuselage 104 and operatively coupled together to define fuselage 104.

Aircraft 101 also may include wings 106, horizontal stabilizers 108, and/or a vertical stabilizer 110, each of which may be constructed as a unitary structure or in subsections that are subsequently assembled together. One or more of fuselage 104, wing 106, horizontal stabilizer 108, vertical stabilizer 110, or a structural subsection thereof may be constructed with and/or may include one or more fastening systems 102 according to the present disclosure.

Figure 2:
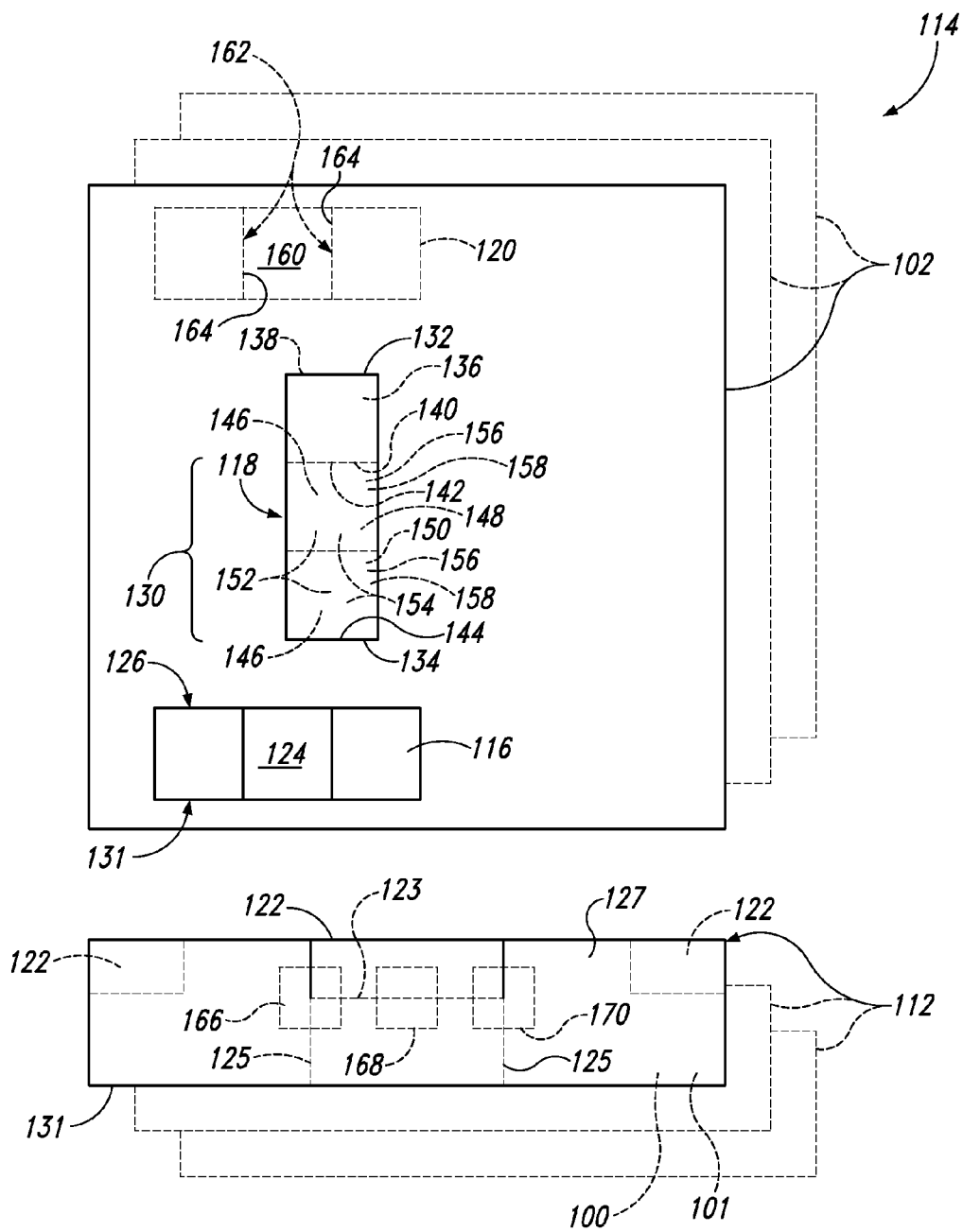
FIG. 2 is a schematic diagram representing examples of fastening systems according to the present disclosure and systems including the same.

FIG. 2 illustrates a schematic representation of non-exclusive examples of systems 114, including one or more fastening systems 102 according to the present disclosure and structure 112 to which fastening system 102 may be coupled. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Fastening system 102 may include a first fastening component 116, a second fastening component 118, and/or a third fastening component 120 (which may also be referred to herein as retaining device 120). Structure 112 may include a first hole 122 which may be configured to receive at least a portion of fastening system 102, thereby allowing fastening system 102 to be selectively coupled to structure 112. For example, a portion of fastening system 102 may be inserted into first hole 122 and secured therein in order to couple first fastening component 116 to structure 112 and substantially prevent rotational movement between the fastened components (e.g., between structure 112, first fastening component 116, second fastening component 118, and/or third fastening component 120). As indicated by dashed line 123, first hole 122 may extend just part way into the thickness of structure 112. In other examples, and as indicated by dashed lines 125, first hole 122 may extend through the entire thickness of structure 112, extending from an outer surface 127 of structure 112 to an inner surface 131 of structure 112. In some examples, fastening system 102 may be used to connect two or more structures 112 together, thereby substantially preventing rotation of the structures 112.

First fastening component 116 may include a second hole 124 formed therethrough. For example, second hole 124 may be formed through the entire thickness of first fastening component 116, extending from an outer surface 126 to an inner surface 128 of first fastening component 116. When fastening system 102 is coupled to structure 112, inner surface 128 of first fastening component 116 may be positioned adjacent structure 112 (e.g., inner surface 128 of first fastening component 116 may be adjacent and/or contacting outer surface 127 of structure 112). In some examples, inner surface 128 of first fastening component 116 may be in contact with structure 112 when fastening system 102 is coupled to structure 112. In other examples, inner surface 128 of first fastening component 116 may be spaced apart from structure 112 and/or one or more intermediate structures (e.g., washers, spacers, etc.) may be positioned between first fastening component 116 and structure 112. First fastening component 116 may be coupled to structure 112 such that it is substantially not rotatable with respect to structure 112. Exemplary first fastening components 116 may include brackets, clips, angles, standoffs, stringer clips, radius fillers, radius enhancements, radius blocks, angled fillers, inserts, nut clips, and/or any other component designed to be coupled to a part such as structure 112 via a fastener or fastening system. In some examples, first fastening component 116 may be another part or a second structure that may be coupled to structure 112. For example, fastening system 102 may consist of second fastening component 118 that is used to couple and substantially prevent relative rotation of two or more structures 112 with respect to one another.

Second fastening component 118 may include an elongate shank 130 that is sized and shaped to be inserted through second hole 124 in first fastening component 116 and/or into or through first hole 122 of structure 112, thereby securing first fastening component 116 to structure 112 (and/or securing two or more structures 112 to each other) such that first fastening component 116 is substantially not rotatable with respect to structure 112 about an axis 129 of elongate shank 130 (and/or such that each respective structure 112 is substantially not rotatable with respect to the other respective structures 112 about axis 129), where axis 129 is a longitudinal axis of second fastening component 118 (e.g., axis 129 is oriented along the length of elongate shank 130) and elongate shank 130 and axis 129 may be referred to herein as longitudinal axis 129. Exemplary second fastening components 118 may include bolts, lockbolts, hi-loks, screws, pins, rivets, dowels, and/or any other component designed to be inserted through or into an opening, such as first hole 122 and/or second hole 124. In one specific example, second fastening component 118 may be a rivet having a non-circular shank, such rivet being used to secure two or more structures 112 to each other such that the structures 112 are substantially not rotatable with respect to one another, about the longitudinal axis of the rivet. In another variation, second fastening component 118 may be a rivet having a circular shank, such rivet being used to secure two or more structures 112 to each other, each of the structures 112 having a non-circular first hole 122.

Second fastening component 118 may extend from a first end 132 to a second end 134, and may include a head portion 136 in addition to elongate shank 130. Head portion 136 may be enlarged with respect to some or all of elongate shank 130, and may be any shape, such as square, circular, elliptical, hexagonal, and/or polygonal. Head portion 136 may be countersunk in some examples. Head portion 136 may be configured to be flush with the surface of first fastening component 116 when elongate shank 130 is inserted through second hole 124. Alternatively, head portion 136 may be configured to protrude from the surface of first fastening component 116 when elongate shank 130 is inserted through second hole 124. Head portion 136 may have a diameter or maximum dimension in the radial direction that is greater than the diameter or maximum radial dimension of elongate shank 130 in some examples. In this manner, elongate shank 130 may be configured to be inserted through or into first hole 122 and second hole 124, while head portion 136 may be too large to be inserted through or into first hole 122 and second hole 124. Head portion 136 may extend from an upper surface 138 to a lower surface 140, where upper surface 138 coincides with first end 132 of second fastening component 118. Lower surface 140 of head portion 136 may be adjacent a first shank end 142. Elongate shank 130 may extend from first shank end 142 to a second shank end 144, which may correspond with second end 134 of second fastening component 118.

First fastening component 116 may be configured to be positioned relative to structure 112 such that first hole 122 and second hole 124 are aligned with one another. First hole 122 and second hole 124 may be non-circular. For example, first hole 122 and second hole 124 may be elliptical, oval, irregular, slot-shaped, fatigue-friendly shaped, contain no sharp corners, curved, and/or any other non-circular shape. First hole 122 and second hole 124 may be substantially identical to each other in size and shape in some examples.

Elongate shank 130 may include a non-circular portion 146 extending along at least a portion of elongate shank 130. In some examples, non-circular portion 146 may extend along substantially the entire length of elongate shank 130 (e.g., from head portion 136 to second end 134 of second fastening component 118). Non-circular portion 146 may have a cross-section that is non-circular and/or non-polygonal. Such non-circular and/or non-polygonal cross-section may be a transverse cross-section, such as a perpendicular cross-section that is perpendicular to a longitudinal axis of elongate shank 130. As used herein, "perpendicular cross-section" refers to the transverse cross-section that is perpendicular to the longitudinal axis of second fastening component 118. For example, non-circular portion 146 may have a perpendicular cross-section that is elliptical, oval, and/or any other shape. In some examples, the perpendicular cross-section of non-circular portion 146 may have a shape that is devoid of straight lines and edges. The perpendicular cross-section of non-circular portion 146 may be approximately equal in size and shape to first hole 122 and/or second hole 124 such that non-circular portion 146 of elongate shank 130 may be inserted through and/or into first hole 122 and second hole 124. In some examples, non-circular portion 146 may be configured such that it has a press fit with first hole 122 and/or second hole 124. For example, non-circular portion 146 may be sized such that it is slightly larger than first hole 122 and/or second hole 124 such that non-circular portion 146 has an interference fit or friction fit within first hole 122 and/or second hole 124. Thus, elongate shank 130 may be inserted through second hole 124 of first fastening component 116 and through and/or into first hole 122 of structure 112 such that first fastening component 116 may be selectively coupled to structure 112 using a single elongate shank 130 such that first fastening component 116 is substantially prevented from rotating with respect to structure 112, about axis 129 of elongate shank 130.

Non-circular portion 146 may be adjacent second end 144 of second fastening component 118 in some examples. Second end 144 of elongate shank 130 may be inserted through second hole 124 of first fastening component 116 such that a portion of second fastening component 118 (e.g., head portion 136) may be positioned on one side of first fastening component 116 and a portion of second fastening component 118 (e.g., at least a portion of elongate shank 130) may be positioned on the opposite side of first fastening component 116. For example, second fastening component 118 may be inserted through second hole 124 such that head portion 136 (e.g., lower surface 140 of head portion 136) is positioned adjacent and/or contacts outer surface 126 of first fastening component 116, elongate shank 130 extends all the way through second hole 124, and second end 144 of second fastening component 118 is positioned adjacent inner surface 128 of first fastening component 116 or spaced away from inner surface 128 (e.g., second end 144 of second fastening component 118 may be positioned on the opposite side of first fastening component 116 than is first end 132 of second fastening component 118). Additionally or alternatively, non-circular portion may be positioned adjacent first end 142 of elongate shank 130 and/or any other location along elongate shank 130. In some examples, elongate shank 130 may be entirely non-circular (e.g., non-circular portion 146 may extend along substantially the entire length of elongate shank 130.

In some examples, elongate shank 130 may include a first portion 148 and a second portion 150, first portion 148 and second portion 150 being arranged adjacent one another, along axis 129 of elongate shank 130. In some examples, first portion 148 of elongate shank 130 may be positioned adjacent first end 142 of elongate shank 130 and second portion 150 may be positioned adjacent second end 144 of elongate shank 130. In other examples, the portions may be switched such that first portion 148 is positioned adjacent second end 144 and second portion 150 is positioned adjacent first end 142. First portion 148 and second portion 150 may comprise any portion of the length of elongate shank 130. In some examples, first portion 148 and second portion 150 may be approximately equal in length. In other examples, first portion 148 may be longer than second portion 150 (e.g., first portion 148 may take up a greater portion of the length of elongate shank 130 than does second portion 150), or second portion 150 may be longer than first portion 148. In some examples, first portion 148 and second portion 150 may be adjacent one another, or they may be spaced apart from one another along axis 129 of elongate shank 130.

First portion 148 and second portion 150 may have different shaped perpendicular cross-sections and/or may have different threads or other features. For example, first portion 148 and/or second portion 150 may have a perpendicular cross-section that is circular. In some examples, first portion 148 and/or second portion 150 may have a non-circular perpendicular cross-section. In some examples, first portion 148 may have a circular perpendicular cross-section while second portion 150 may have a non-circular perpendicular cross-section. Similarly, first portion 148 may have a non-circular perpendicular cross-section while second portion 150 may have a circular perpendicular cross-section. In one specific example, one or more of first portion 148 and second portion 150 may have an elliptical perpendicular cross-section where the perpendicular cross-section has a major diameter portion 156 and a minor diameter portion 158, major diameter portion 156 having a major diameter and minor diameter portion 158 having a minor diameter, where the major diameter is greater than the minor diameter. In some examples, major diameter portion 156 may be threaded, while minor diameter portion 158 may be unthreaded.

Elongate shank 130 may include a helical threaded portion 152 that has helical threads positioned around the shank. In some examples, helical threaded portion 152 may extend along the entire length of elongate shank 130, or helical threaded portion 152 may extend along only a portion of the length of elongate shank 130. Helical threaded portion 152 may coincide with first portion 148 and/or second portion 150 of elongate shank 130 (e.g., first portion 148 and/or second portion 150 may include helical threads located thereon). Helical threaded portion 152 may have a circular or approximately circular perpendicular cross-section in some examples. In other examples, helical threaded portion 152 may have a non-circular (e.g., elliptical) perpendicular cross-section.

In some examples, elongate shank 130 may include one or more annular rings 154. In some examples, elongate shank 130 includes a plurality of annular rings 154. Annular rings 154 may be positioned on first portion 148 and/or second portion 150 of elongate shank 130. In some examples, annular rings 154 may be positioned on a portion of elongate shank 130 having a non-circular perpendicular cross-section. Annular rings 154 may be circular even when positioned on a section of elongate shank 130 having a non-circular perpendicular cross-section (e.g., annular rings 154 may be coupled to elongate shank 130 such that the rings contact portions of the circumference of elongate shank 130 but not the entire circumference of elongate shank 130). Annular rings 154 may be adjacent one another and/or may be spaced apart from one another along axis 129 of elongate shank 130. Annular rings 154 and/or helical threaded portion 152 may be configured to engage with third fastening component 120 in systems 114 that include such third fastening component 120.

Third fastening component 120 may be configured to be positioned with respect to first fastening component 116 and second fastening component 118 such that third fastening component 120 substantially prevents movement of second fastening component 118 with respect to first fastening component 116 in an axial direction (e.g., along axis 129 of elongate shank 130). In other words, third fastening component 120 may be configured to prevent elongate shank 130 from accidentally withdrawing from first hole 122 and/or second hole 124.

Third fastening component 120 may include a third hole 160, which may be approximately the same size and shape as first hole 122 and/or second hole 124. Alternatively, third hole 160 may be a different size and/or shape than first hole 122 and/or second hole 124. For example, third hole 160 may be circular, and third fastening component 120 may be a conventional nut or other retaining device. Third hole 160 may be sized and shaped to receive and/or engage elongate shank 130 of second fastening component 118. For example, third fastening component 120 may be configured to be positioned with respect to second fastening component 118 such that elongate shank 130 may be inserted through third hole 160 of third fastening component 120. Additionally or alternatively, third fastening component 120 may be positioned such that it engages structure 112. In some examples, third fastening component 120 may engage both structure 112 and elongate shank 130 and may serve to tighten second fastening component 118 with respect to first fastening component 116 and structure 112.

In some examples, third hole 160 may be non-circular, such as elliptical or oval-shaped. Third hole 160 may include internal threads 162 on an inner surface 164 of third hole 160. Thus, third fastening component 120 may be configured to be threaded onto elongate shank 130, such as by engaging internal threads 162 of third hole 160 with elongate shank 130 (e.g., with helical threaded portion 152 and/or annular rings 154 of elongate shank 130). In other examples, third fastening component 120 may be pressed or swaged onto elongate shank 130, and/or may be configured to have a press fit with elongate shank 130. Third fastening component 120 may be, for example, a nut, a retaining collar, a washer, a fastener nut, and/or any other device that may be configured to retain elongate shank 130 in place once it is inserted through first hole 122 and second hole 124 (e.g., second fastening component 118 may not be removable from first hole 122 and second hole 124 without first removing third fastening component 120). In some specific examples, third fastening component 120 may be a two-piece nut, a hinged nut, and/or a different device that may be coupled to elongate shank 130 without threading it onto elongate shank 130. Examples of two-piece nuts and hinged nuts are described in U.S. Pat. Nos. 7,934,896 and 6,821,070, which are incorporated by reference herein in their entirety for all purposes. Alternatively, second fastening component 118 may be configured to retain itself within first hole 122 and second hole 124 without a separate retaining device 120. For example, second fastening device 118 may comprise a rivet, and the driven end of the rivet may be configured to retain the rivet in place once inserted through first hole 122 and/or second hole 124, without the need for a separate retaining device 120 in some examples.

Structure 112 may be any suitable structure or apparatus (e.g., apparatus 100), or portion or component thereof. For example, structure 112 may be an aircraft 101, or a part or component thereof, but the disclosure is not limited to the same. In some examples, structure 112 may be formed entirely or partially of one or more composite materials 166, one or more metallic materials 168 (e.g., aluminum, titanium, etc.), and/or one or more non-pliable materials 170. Structure 112 may be a plurality of structures 112 and/or may include a plurality of first holes 122. Each first hole 122 may extend through the entire thickness of structure 112, or through only a portion of its thickness. Each first hole 122 may be formed in and/or through one or more composite materials 166, metallic materials 168, and/or non-pliable materials 170. Structure 112 may be configured to perform a structural function, such as supporting or withstanding a load. Structure 112 may be formed of a material having a significant thickness, such that each first hole 122 has a depth or length that is equal to the thickness of structure 112 at the location of each respective first hole 122. For example, each first hole 122 may be formed through a portion of structure 112 that is at least 5 mm thick, at least 10 mm thick, at least 15 mm thick, at least 20 mm thick, and/or at least 25 mm thick. In some examples, structure 112 may be configured to be subject to fatigue loading. Each first hole 122 formed in structure 112 may be formed using any suitable technique. For example, orbital drilling may be used to form non-circular first holes 122 in structure 112.

Presently disclosed systems 114 including one or more fastening systems 102 may be used in construction of an aircraft 101 or other apparatus 100, such as to prevent rotation of one or more first fastening components 116 with respect to structure 112 and/or to keep first fastening component 116 and structure 112 in the same relative position to one another. Presently disclosed systems 114 may be used to prevent rotation of multiple structural elements in a stack without needing secondary pieces, such as tabs or etc., to be formed in the fastening components. A single apparatus 100 may include a plurality of fastening systems 102. For example, a single aircraft 101 may include thousands of brackets, each of which requires at least two fasteners to prevent rotation thereof, using conventional fastening systems. However, using presently disclosed fastening systems 102, each first fastening component 116 (e.g., a bracket) may be secured to structure 112 with a single second fastening component 118 (e.g., a single bolt), which may reduce the number of parts needed to manufacture structure 112 and/or apparatus 100, thereby decreasing costs and/or installation time in some examples. Furthermore, presently disclosed systems 114 may enable drilling fewer holes (e.g., first holes 122) in structure 112, which may also reduce costs and/or manufacturing times.

Figure 3:
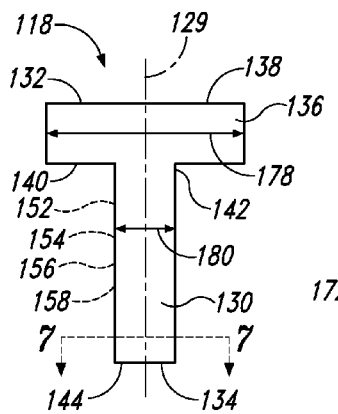
FIG. 3 is a schematic diagram representing examples of a second fastening component according to the present disclosure, shown as an elevation view.

FIG. 3 illustrates a schematic representation of non-exclusive examples of second fastening component 118, shown as an elevation view. Second fastening component 118 may include head portion 136 and elongate shank 130 and may extend from first end 132 to second end 134. Head portion 136 may include upper surface 138 corresponding with first end 132 and lower surface 140 adjacent first shank end 142. Elongate shank 130 may extend along axis 129 (e.g., in an axial direction) from first shank end 142 to second shank end 144, which may correspond with second end 134 of second fastening component 118. Elongate shank 130 may include one or more features such as helical threaded portion 152, annular rings 154, major diameter portion 156, and/or minor diameter portion 158, each of which may be positioned at any location along the length of elongate shank 130 and for any portion of the length. For example, one or more of the features may be present along the entire length of elongate shank 130, and/or one or more of the features may be present along a portion of the length of elongate shank 130.

Figure 4:
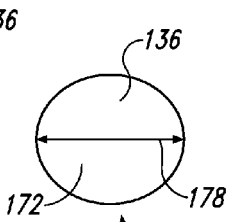
FIG. 4 is a schematic diagram representing examples of a top plan view of a head portion of a second fastening component according to the present disclosure.
Figure 5:
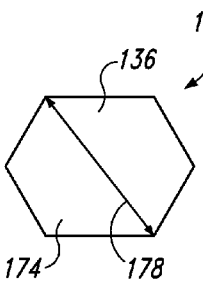
FIG. 5 is a schematic diagram representing examples of a top plan view of a head portion of a second fastening component according to the present disclosure.
Figure 6:
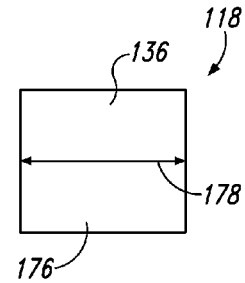
FIG. 6 is a schematic diagram representing examples of a top plan view of a head portion of a second fastening component according to the present disclosure.

Head portion 136 may take any suitable shape. FIGS. 4-6 illustrate schematic representations of non-exclusive examples of head portion 136, shown as top plan views. FIG. 4 illustrates a circular head portion 172, FIG. 5 illustrates a hexagonal head portion 174, and FIG. 6 illustrates a square head portion 176, however these examples are not limiting, and any shape head portion 136 may be used with disclosed second fastening components 118. Head portion 136 may have a diameter or maximum dimension that is larger than that of elongate shank 130. For example, head portion 136 may have a head dimension 178 corresponding to the diameter or maximum dimension of head portion 136, depending on the shape of head portion 136. Similarly, elongate shank 130 may have a shank dimension 180 corresponding to the diameter or major diameter or maximum dimension of elongate shank 130, where head dimension 178 is greater than shank dimension 180. In this manner, second fastening component 118 may be configured such that elongate shank 130 may be inserted through a first hole 122 in structure 112 (FIG. 2) and second hole 124 in first fastening component 116 (FIG. 2), while head portion 136 may be too large to be inserted through first hole 122 and/or through second hole 124.

Figure 7:
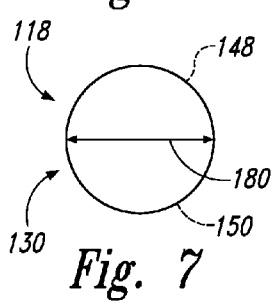
FIG. 7 is a schematic diagram representing examples of a perpendicular cross-section of an elongate shank of a second fastening component according to the present disclosure, taken along line 7-7 in FIG. 3.
Figure 8:
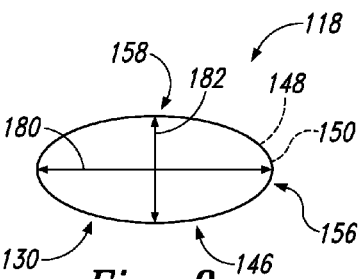
FIG. 8 is a schematic diagram representing examples of a perpendicular cross-section of an elongate shank of a second fastening component according to the present disclosure, taken along line 7-7 in FIG. 3.
Figure 9:
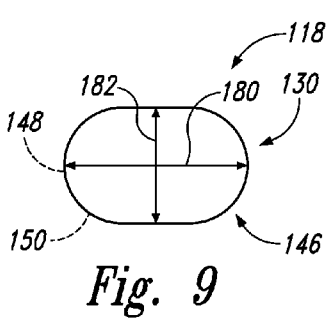
FIG. 9 is a schematic diagram representing examples of a perpendicular cross-section of an elongate shank of a second fastening component according to the present disclosure, taken along line 7-7 in FIG. 3.

FIGS. 7-9 illustrate schematic representations of cross-sectional views of non-exclusive examples of elongate shank 130, taken along line 7-7 in FIG. 3. Each of FIGS. 7-9 may correspond with first portion 148 and/or second portion 150 of elongate shank 130, in examples where elongate shank 130 includes first portion 148 and/or second portion 150. FIGS. 8-9 illustrate examples of non-circular portion 146 of elongate shank 130, while FIG. 7 shows a portion of elongate shank 130 having a circular perpendicular cross-section. Non-circular portion 146 of FIG. 8 has an elliptical perpendicular cross-section and non-circular portion 146 of FIG. 9 has a slot-shaped perpendicular cross-section, but these examples are non-limiting, and other shapes are also possible and within the scope of the present disclosure. FIG. 7 illustrates shank dimension 180 as the diameter of the circular portion of elongate shank 130, while shank dimension 180 in FIG. 8 corresponds to a maximum diameter of major diameter portion 156 and shank dimension 180 in FIG. 9 corresponds to a maximum dimension of the cross-sectional shape. FIGS. 8 and 9 also include a minimum shank dimension 182, corresponding to minor diameter portion 158 in FIG. 8 and corresponding to the minimum dimension of the cross-sectional shape in FIG. 9. Such cross-sectional shapes shown in FIGS. 7-9 may correspond to the entire length of elongate shank 130 or to a portion thereof. For example, in some second fastening components 118, elongate shank 130 may include a portion having a circular perpendicular cross-section (e.g., one of first portion 148 or second portion 150) and a non-circular portion 146 positioned in a different location along elongate shank 130 (e.g., corresponding to the other of first portion 148 or second portion 150).

Figure 10:
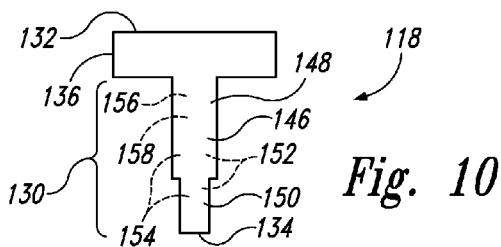
FIG. 10 is a schematic diagram representing examples of an elevation view of a second fastening component according to the present disclosure, with an elongate shank having a non-circular portion and a circular portion.

FIG. 10 shows a schematic representation of an elevation view of examples of second fastening component 118 having an elongate shank 130 with first portion 148 being a non-circular portion 146, and second portion 150 being a circular portion of elongate shank 130. One or both of first portion 148 and second portion 150 may include threaded portion 152 and/or one or more annular rings 154. In some examples, threaded portion 152 and/or annular rings 154 may be positioned adjacent second end 134 of elongate shank 130. In these examples, elongate shank 130 may be inserted through first hole 122 and second hole 124 (FIG. 2) such that first portion 148 is positioned within first hole 122 and second hole 124, thereby preventing rotation of second fastening component 118 and first fastening component 116 with respect to structure 112, while second portion 150 of elongate shank 130 may be positioned outside of first hole 122 (e.g., second portion 150 may extend away from structure 112 on the opposite side of structure 112 from first fastening component 116). In this manner, a conventional nut or other third fastening component 120 (FIG. 2), such as those having a circular third hole 160, may be threaded onto second portion 150 or otherwise coupled thereto in some examples. In other examples, second fastening component 118 may not include any threaded portion 152 or annular rings 154, such as in examples where second fastening component 118 comprises a rivet.

Figure 11:
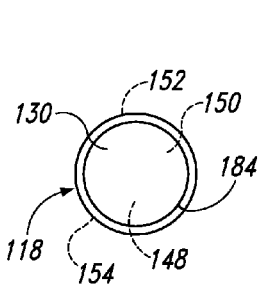
FIG. 11 is a schematic diagram representing examples of a cross-sectional view of an elongate shank of a second fastening component according to the present disclosure, having a threaded portion and/or one or more annular rings.
Figure 12:
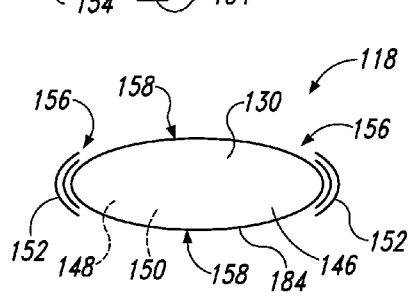
FIG. 12 is a schematic diagram representing examples of a cross-sectional view of an elongate shank of a second fastening component according to the present disclosure, having a threaded portion on a non-circular portion of the shank.
Figure 13:
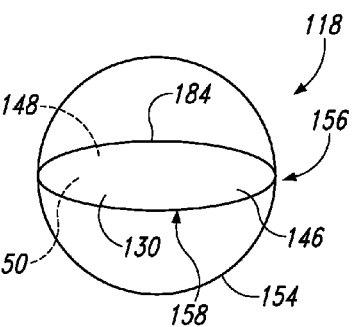
FIG. 13 is a schematic diagram representing examples of a cross-sectional view of an elongate shank of a second fastening component according to the present disclosure, having one or more annular rings on a non-circular portion of the shank.

FIGS. 11-13 illustrate schematic representations of cross-sectional views of non-exclusive examples of elongate shank 130, such as may be taken along line 7-7 in FIG. 3. FIG. 11 is a schematic diagram representing examples of a perpendicular cross-sectional view of elongate shank 130 of second fastening component 118 having threaded portion 152 and/or one or more annular rings 154. As shown in FIG. 11, elongate shank 130 may include a portion having a circular perpendicular cross-section, which may correspond to first portion 148 or second portion 150. Threads, such as helical threads, may be formed on a portion of an outer surface 184 of elongate shank 130, thereby forming threaded portion 152. Additionally or alternatively, one or more annular rings 154 may be provided around the circumference of elongate shank 130. Such threaded portion 152 and/or annular rings 154 may be configured to engage other components of system 114 (FIG. 2), such as third fastening component 120 (e.g., third hole 160 of third fastening component 120), first fastening component 116 (e.g., second hole 124 of first fastening component 116), and/or structure 112 (e.g., first hole 122 of structure 112).

FIG. 12 is a schematic diagram representing examples of a cross-sectional view of elongate shank 130 of second fastening component 118, having threaded portion 152 positioned on just a portion of the circumference of elongate shank 130 (e.g., on a portion of the circumference of non-circular portion 146 of elongate shank 130). For example, elongate shank 130 may have a perpendicular cross-section that is non-circular (e.g., elliptical) with major diameter portion 156 and minor diameter portion 158. In some examples, major diameter portion 156 may be threaded, while minor diameter portion 158 may be unthreaded, thereby allowing a circular third fastening component 120 having a third hole 160 with a diameter equal to the diameter of major diameter portion 156 to be threaded onto elongate shank 130, albeit with some areas of third fastening component 120 not in engagement with elongate shank 130 (e.g., third hole 160 of third fastening component 120 may be configured to contact and/or engage with major diameter portion 156 of elongate shank 130, but not with minor diameter portion 158 of elongate shank 130).

FIG. 13 is a schematic diagram representing examples of a cross-sectional view of an example of elongate shank 130 of second fastening component 118 having one or more annular rings 154 positioned on non-circular portion 146 of elongate shank 130. As shown in FIG. 13, annular rings 154 may be positioned with respect to non-circular portion 146 such that only a portion of outer surface 184 of elongate shank 130 is in contact with annular ring 154. For example, major diameter portion 156 may contact annular rings 154, while minor diameter portion 158 may not contact annular rings 154, such that annular rings 154 may be spaced apart from minor diameter portion 158. In this manner, only a portion of the circumference of non-circular portion 146 may be engaged with annular rings 154, due to the difference in shapes of annular rings 154 and the perpendicular cross-section of non-circular portion 146, which in this example is shown as being elliptical.

Annular rings 154 and/or threaded portion 152 (e.g., helical threads 152) as shown in FIGS. 11-13 may be positioned along a portion of the length of elongate shank 130 or along substantially the entire length of elongate shank 130. Such annular rings 154 and/or threads 152 may be configured to engage with third fastening component 120 (FIG. 2). For example, third fastening component 120 may include a nut that is configured to be threaded onto threaded portion 152 and/or configured to engage with annular rings 154. Additionally or alternatively, third fastening component 120 may include a retaining collar that is configured to be swaged onto annular rings 154. Thus, third fastening component 120 may include a circular third hole 160 and may still be able to engage with non-circular portion 146 of elongate shank 130 in some examples. In other examples, third hole 160 of third fastening component 120 may be non-circular as well, and may be coupled to non-circular portion 146 of elongate shank 130 without threading or rotating third fastening component 120, such as by being a hinged or two-part nut or other component.

Turning now to FIGS. 14-23, illustrative non-exclusive examples of fastening systems 102 according to the present disclosure are illustrated. Where appropriate, the reference numerals from the schematic illustrations of FIGS. 2-13 are used to designate corresponding parts of the fastening systems illustrated in FIGS. 14-23, however, the examples of FIGS. 14-23 are non-exclusive and do not limit fastening systems 102 to the illustrated embodiments. That is, fastening systems 102 are not limited to the specific embodiments of the illustrated FIGS. 14-23 and may incorporate any number of the various aspects, configurations, characteristics, properties, etc. of the fastening systems 102 that are illustrated in and discussed with reference to the schematic representations of FIGS. 2-13 and/or the embodiments of FIGS. 14-23, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the embodiments shown in FIGS. 14-23, however, it is within the scope of the present disclosure that the previously discussed features, variants, etc. may be utilized with any and all such fastening systems.

Figure 14:
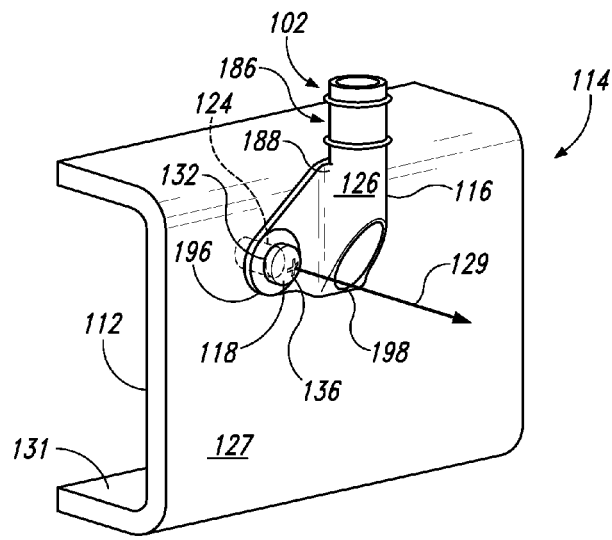
FIG. 14 is a perspective view of a system including a fastening system according to the present disclosure.
Figures 15, 16:
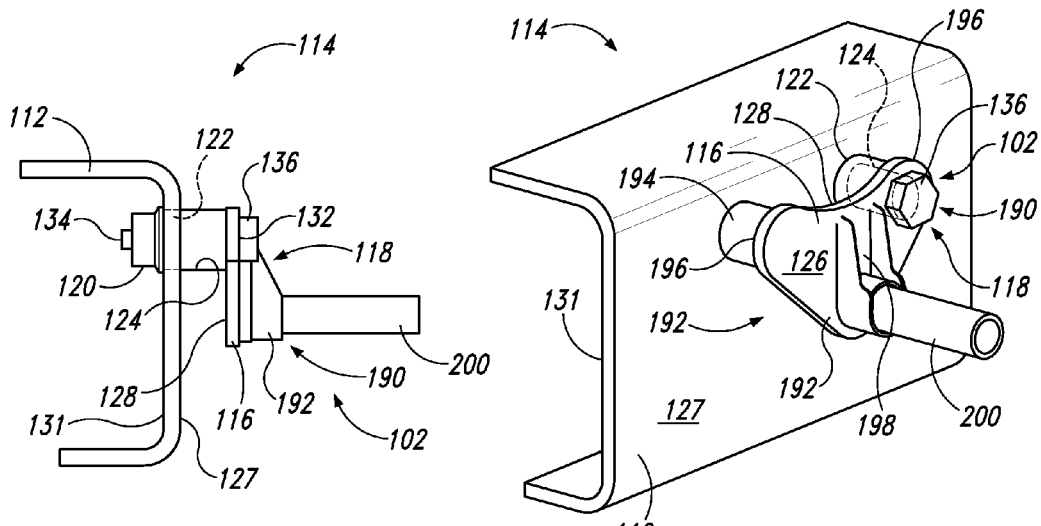
FIG. 15 is a side elevation view of a system including a fastening system according to the present disclosure.
FIG. 16 is a perspective view of the system of FIG. 15.

FIG. 14 shows an example of system 114 with a first fastening system 186 (which is an example of fastening system 102) having a vertical insert 188 (which is an example of first fastening component 116). Vertical insert 188 includes second hole 124 through which second fastening component 118 is inserted. Second fastening component 118, shown in the form of a bolt 118, may be arranged such that head portion 136 of second fastening component 118 is positioned adjacent outer surface 126 of vertical insert 188, with elongate shank 130 (not visible in FIG. 14) passing through second hole 124 of vertical insert 188 and also extending through first hole 122 in structure 112. As shown in FIG. 15, second hole 124 may be non-circular (e.g., elliptical or oval). The first hole (e.g., first hole 122, although not visible in FIG. 14) may be similarly sized and shaped (e.g., also elliptical or oval, having substantially equal major and minor diameters and orientation as second hole 124). The elongate shank (e.g., elongate shank 130, although not visible in FIG. 14) of second fastening component 118 may include a non-circular portion (e.g., non-circular portion 146) being configured to be inserted through and engage with first hole 122 and second hole 124, thereby preventing rotation of the elongate shank and vertical insert 188 with respect to the first hole in structure 112 and with respect to structure 112, by virtue of the geometry of the elongate shank, the first hole, and second hole 124. Vertical insert 188 thus may be coupled to outer surface 127 of structure 112 such that vertical insert 188 is substantially not rotatable with respect to structure 112, about axis 129 of second fastening component 118. As with all examples shown in FIGS. 14-23, placement of second fastening component 118 and second hole 124 may be altered as compared to the illustrated placement. For example, while FIGS. 14-23 may show asymmetrical fastening systems, the fastening systems may be symmetrical in some examples. For example, second hole 124 may be centrally located in first fastening component 116, rather than off-center, as shown.

FIGS. 15-16 illustrate an example of system 114 having a second fastening system 190 (which is an example of fastening system 102) that includes a self-locking insert 192 (which is an example of first fastening component 116). Self-locking insert 192 may be spaced apart from outer surface 127 of structure 112, such as by the length of second hole 124 and/or by a spacer 194 positioned between inner surface 128 of self-locking insert 192 and outer surface 127 of structure 112. Self-locking insert 192 (or any first fastening component disclosed herein) may be symmetrical or asymmetrical in shape. For example, vertical insert 188 of FIG. 14 may be asymmetrical, with a single projecting flange portion 196 extending from an insert portion 198, whereas conventional fastening components include two projecting flanges extending from a central insert portion to accommodate two fasteners (e.g., bolts) to prevent rotation of the conventional fastening component. Similarly, self-locking insert 192 may be asymmetrical, or symmetrical (as shown). As shown in FIG. 16, self-locking insert 192 may be symmetrical, with a projecting flange 196 on either side of central insert portion 198, however, self-locking insert 192 still may be secured to structure 112 with a single second fastening component 118, such as by including second hole 124 and second fastening component 118 on one of the projecting flanges 196 and spacer 194 between the other of the projecting flanges 196 and structure 112. Central insert portion 198 may be configured to, for example, receive a device 200 for a load-bearing application. In alternative arrangements, self-locking insert 192 may be configured such that second hole 124 is formed in central insert portion 198 rather than on either side thereof.

Figure 17:
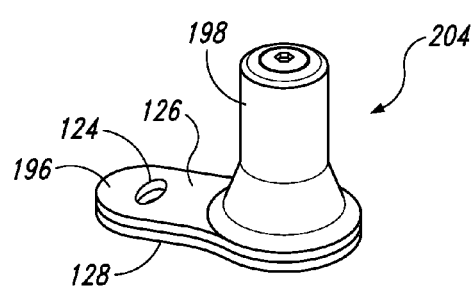
FIG. 17 is a perspective view of a first fastening component according to the present disclosure.
Figure 18:
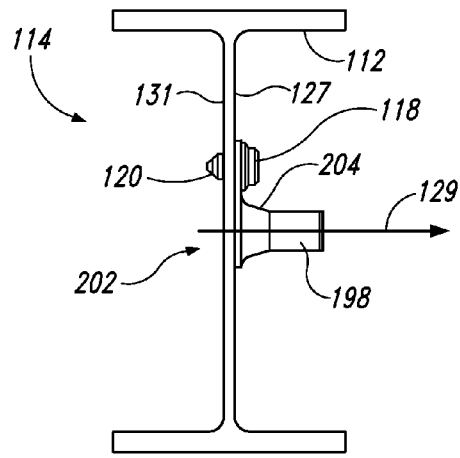
FIG. 18 is a side elevation view of a system including the first fastening component of FIG. 17.

FIGS. 17-18 illustrate an example of system 114 (FIG. 18) having a third fastening system 202 (which is an example of fastening system 102) that includes an axial insert 204 (which is an example of first fastening component 116). As compared to FIG. 14, which shows vertical insert 188 having a vertically-oriented insert portion 198 (e.g., insert portion 198 is arranged perpendicularly to axis 129 of second fastening component 118), axial insert 204 is configured to have an axially-oriented insert portion 198 extending along axis 129 of second fastening component 118.

Figure 19:
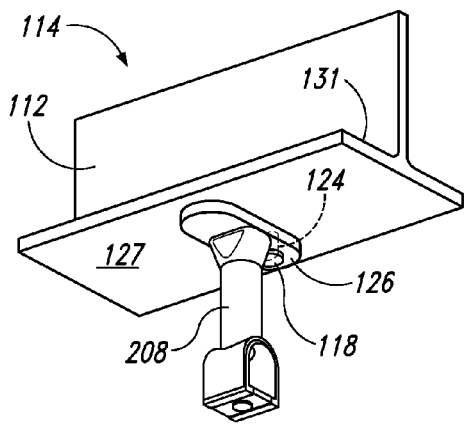
FIG. 19 is a perspective view of a system including a fastening system according to the present disclosure.
Figure 20:
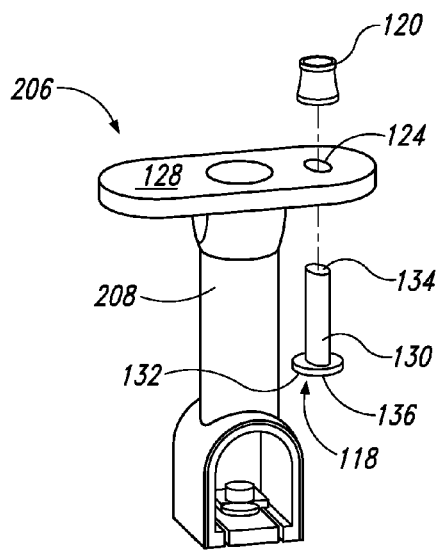
FIG. 20 is a perspective view of the fastening system of FIG. 19, in an exploded view, apart from the structure to which it is coupled in FIG. 19.

FIGS. 19-20 illustrate an example of system 114 (FIG. 19) having a fourth fastening system 206 (which is an example of fastening system 102) that includes a standoff 208 (which is an example of first fastening component 116). FIG. 20 shows the components of fourth fastening system 206 in an exploded view, and shows standoff 208 having second hole 124, through which elongate shank 130 of second fastening component 118 may be inserted such that head portion 136 is positioned adjacent outer surface 126 of standoff 208 and elongate shank 130 extends beyond inner surface 128 of standoff 208 such that third fastening component 120 may be inserted onto (or otherwise coupled to) elongate shank 130 opposite head portion 136 (e.g., third fastening component 120 may be inserted adjacent second end 134 of second fastening component 118). Third fastening component 120 is shown in the form of a retaining collar in FIG. 20.

Figure 21:
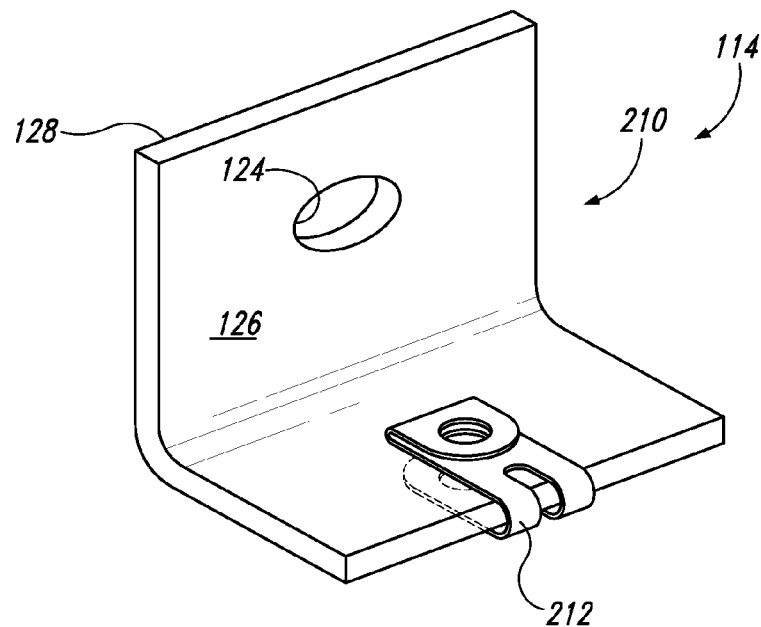
FIG. 21 is a perspective view of a system according to the present disclosure, including a fastening component having a non-circular first hole formed therein and a nut clip coupled thereto.

FIG. 21 illustrates an example of system 114 (which is an example of fastening system 102) having a fifth fastening component 210 that may include a nut clip 212. Fifth fastening component 210 (which may be an example of first fastening component 116) may include second hole 124 that is a non-circular hole (e.g., an elliptical hole) through fifth fastening component 210 (e.g., second hole 124 may extend from outer surface 126 to inner surface 128 of fifth fastening component 210). Whereas conventional fastening systems require at least two holes formed in the component and require at least two respective bolts to be inserted through those holes, fifth fastening component 210 may include just a single second hole 124 and a single bolt (or other single second fastening component 118) may be positioned extending through second hole 124 in order to secure fifth fastening component 210 to another fastening component or structure (e.g., to structure 112) and substantially prevent rotation thereof.

Figure 22:
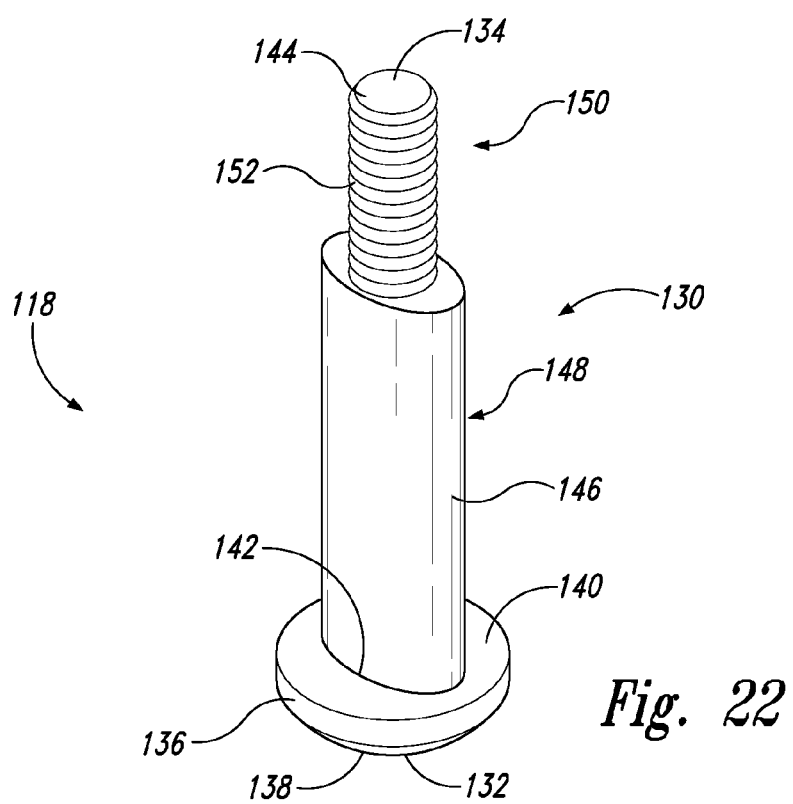
FIG. 22 is a perspective view of an example of a second fastening component according to the present disclosure.

FIG. 22 illustrates an example of second fastening component 118 that may be used with any of the above-illustrated systems. For example, second fastening component 118 may include an elongate shank 130 having a non-circular portion 146 that may be configured to be inserted through any non-circular hole (e.g., first hole 122 and/or second hole 124). As shown in FIG. 22, non-circular portion 146 may extend along just a portion of the length of elongate shank 130, and may correspond to a first portion 148 that initiates at first shank end 142, adjacent lower surface 140 of head portion 136. The second portion 150 of elongate shank 130 may, as shown, have a circular perpendicular cross-section and may extend from first portion 146 to second shank end 144 of elongate shank 130. Second portion 150 may have a helical threaded portion 152 which may be configured to engage with, for example, a third fastening component (e.g., third fastening component 120 of FIG. 2), which may be, for example, a conventional nut configured to be threaded onto helical threaded portion 152. In this manner, non-circular portion 146 may be inserted through one or more non-circular holes in order to prevent rotation of one or more parts with respect to one another and elongate shank 130, using a single second fastening component 118 instead of two or more conventional bolts to accomplish the same prevention of rotation.

Figure 23:
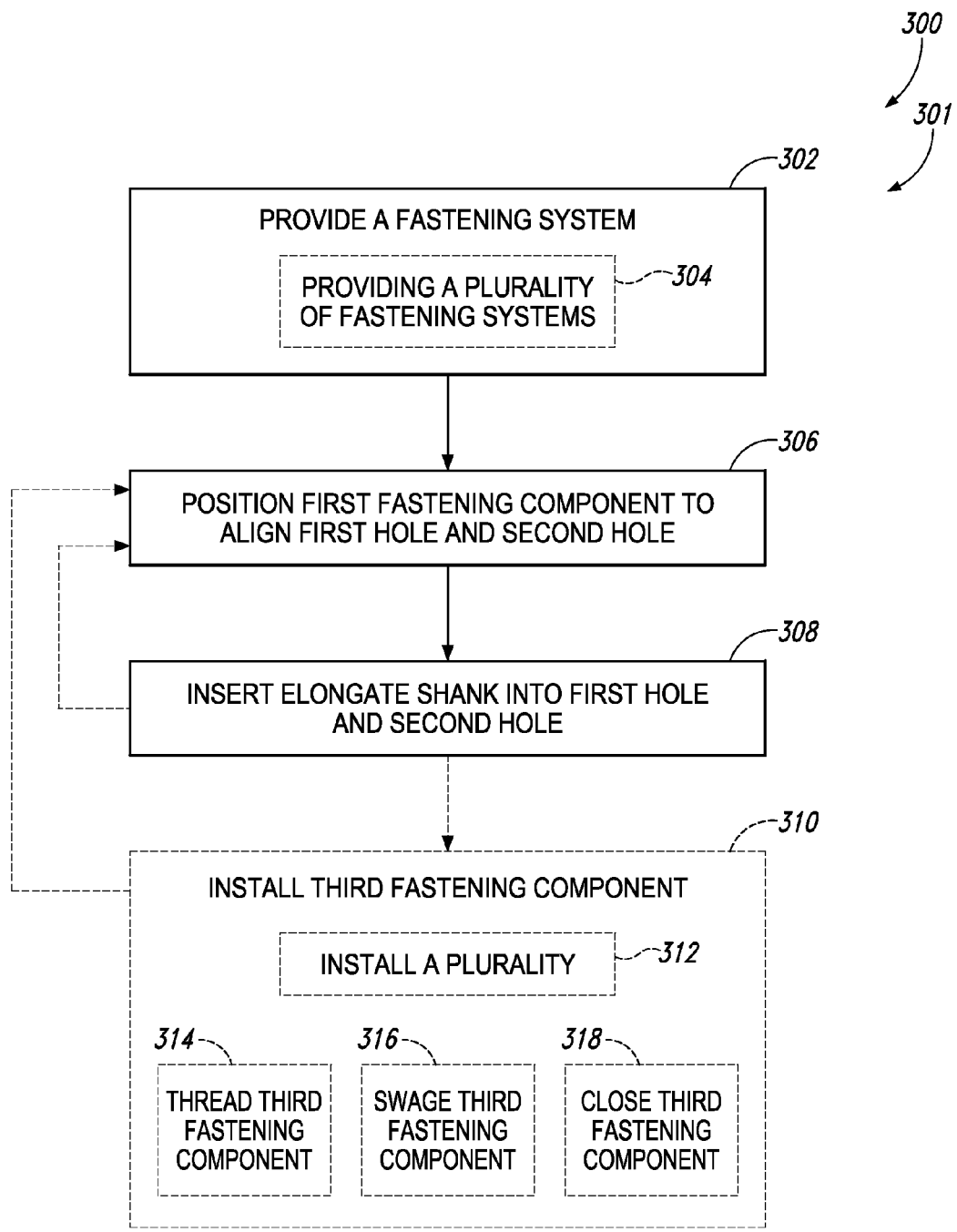
FIG. 23 is a schematic flow chart diagram representing examples of methods of installing a fastening system according to the present disclosure.

FIG. 23 schematically provides a flowchart that represents illustrative, non-exclusive examples of methods 300 of using or installing fastening systems (e.g., fastening systems 102) according to the present disclosure. In FIG. 23, some steps are illustrated in dashed boxes indicating that such steps may be optional or may correspond to an optional version of methods 300 according to the present disclosure. That said, not all methods 300 according to the present disclosure are required to include the steps illustrated in solid boxes. The methods 300 and steps illustrated in FIG. 23 are not limiting and other methods 300 and steps are within the scope of the present disclosure, including methods 300 having greater than or fewer than the number of steps illustrated, as understood from the discussions herein.

Methods 300, for example, a method 301 for coupling a fastening system (e.g., fastening system 102) to a structure (e.g., structure 112) having a first hole (e.g., first hole 122) may be performed to selectively couple the fastening system to the structure such that at least a portion of the fastening system is substantially not rotatable with respect to the structure. Methods 300, 301 may include providing a fastening system according to the present disclosure at 302. For example, providing a fastening system at 302 may include providing a fastening system that includes a first fastening component (e.g., first fastening component 116) and a second fastening component (e.g., second fastening component 118), the first fastening component having a second hole (e.g., second hole 124) formed therethrough and the second fastening component having an elongate shank (e.g., elongate shank 130). The first fastening component may be configured to be positioned relative to the structure such that the first hole and the second hole are aligned with one another. The elongate shank may be sized and shaped to be inserted through the second hole and into or through the first hole, thereby securing the first fastening component to the structure such that the first fastening component is substantially not rotatable with respect to the structure about the axis (e.g., axis 129) of the elongate shank. The first hole and second hole may be non-circular, and the elongate shank may include a non-circular portion (e.g., non-circular portion 146) extending along at least a portion of the elongate shank and having a first perpendicular cross-section that is non-circular and non-polygonal (e.g., elliptical). Providing a fastening system at 302 may include providing a plurality of fastening systems at 304, where each of the plurality of fastening systems may be identical to one another, or one or more of the plurality of fastening systems may be different from one or more others of the plurality of fastening systems.

Methods 300, 301 may include positioning the first fastening component with respect to the structure such that the first hole is aligned with the second hole at 306. For example, the first hole and the second hole may be concentrically aligned with one another and may be substantially the same shape and size. Positioning the first fastening component at 306 may include positioning the first fastening component such that an inner surface (e.g., inner surface 128) is adjacent and/or contacts the structure and an outer surface (e.g., outer surface 126) faces away from the structure, where the second hole extends from the inner surface to the outer surface. The elongate shank may be inserted into the second hole of the first fastening component and the first hole of the structure at 308. Inserting the elongate shank at 308 may effectively couple the first fastening component to the structure such that rotation of the first fastening component with respect to the structure about the axis of the elongate shank is substantially prevented. For example, inserting an elongate shank having an elliptical perpendicular cross-section into an elliptical first hole and elliptical second hole may substantially prevent the first fastening component from rotating around the elongate shank as well as substantially prevent rotation of the elongate shank with respect to the structure (e.g., with respect to the first hole) due to the geometry of the elongate shank and holes, thereby substantially preventing the first fastening component from rotating about the structure.

Positioning the first fastening component at 306 may include positioning the first fastening component such that the second hole of the first fastening component is sandwiched between the first hole of the structure and a portion of the elongate shank (e.g., a head portion, such as head portion 136). For example, inserting the elongate shank at 308 may include inserting the elongate shank such that the head portion (e.g., a lower surface of the head portion, such as lower surface 140) contacts the first fastening component, pressing the first fastening component (e.g., pressing the outer surface of the first fastening component) against the structure, and substantially preventing axial movement of the first fastening component with respect to the structure.

In methods 300, 301 including providing a plurality of fastening systems at 304, the structure may include a plurality of first holes and positioning the first fastening component with respect to the structure such that the first hole is aligned with the second hole at 306 may include positioning each respective first fastening component of each of the plurality of fastening systems such that each respective second hole is aligned with a respective first hole of the structure. Furthermore, inserting the elongate shank of the second fastening component into the first hole and the second hole at 308 may include inserting each respective elongate shank of each of the respective second fastening components of each of the plurality of fastening systems into a respective first hole and a respective second hole.

Methods 300, 301 may include installing a third fastening component (e.g., third fastening component 120) at 310. For example, the third fastening component may be installed on, inserted on, or otherwise coupled to the elongate shank of the second fastening component. In some methods 300, 301, installing the third fastening component at 310 may include removably installing the third fastening component such that the third fastening component may be selectively removable from the elongate shank if it is desired to remove the fastening system from the structure. In other methods 300, 301, the third fastening component may be installed on the elongate shank in a semi-permanent or permanent manner, such that removal of the third fastening component is impossible or difficult without damaging the third fastening component, second fastening component, first fastening component, and/or the structure. Installing the third fastening component at 310 may include installing two or more third fastening components at 312. For example, two or more third fastening components may be installed on or coupled to a single elongate shank in some methods. Additionally or alternatively, in methods 300, 301 that include providing a plurality of fastening systems at 304, one or more respective third fastening components may be installed on or coupled to each respective elongate shank of each respective second component of each of the plurality of fastening systems.

The third fastening component may be configured such that installing the third fastening component at 310 substantially prevents axial movement of the second fastening component (e.g., movement along the axis of the elongate shank, into or out of the first hole and/or second hole) with respect to the structure and the first fastening component. Installing the third fastening component at 310 may include, for example, threading the third fastening component onto the elongate shank at 314, swaging the third fastening component on to the elongate shank at 316, and/or closing the third fastening component onto or about the elongate shank at 318.

Illustrative, non-exclusive examples of inventive subject matter according to the present disclosure are described in the following enumerated paragraphs:

A1. A fastening system configured to be coupled to a structure having a first hole formed therein, the fastening system comprising:

a first fastening component having a second hole formed therethrough; and a second fastening component having an elongate shank, the elongate shank being sized and shaped to be inserted through the second hole in the first fastening component and into the first hole in the structure, thereby securing the first fastening component to the structure such that the first fastening component is substantially not rotatable with respect to the structure, wherein the first hole and the second hole are not circular.

A2. The fastening system of paragraph A1, wherein the first hole and the second hole are elliptical.

A3. The fastening system of paragraph A1, wherein the first hole and the second hole are oval.

A4. The fastening system of any of paragraphs A1-A3, wherein the first hole and the second hole are substantially identical in size and shape.

A5. The fastening system of any of paragraphs A1-A4, wherein the first fastening component is configured to be positioned relative to the structure such that the first hole and the second hole are aligned with one another.

A6. The fastening system of any of paragraphs A1-A5, wherein the first fastening component is one or more of a bracket, a clip, an angle bracket, a standoff, a stringer clip, a radius filler, a radius enhancement, a radius block, a mounting device, and/or an angled filler.

A7. The fastening system of any of paragraphs A1-A6, wherein the second fastening component is one or more of a bolt, a pin, a screw, a lockbolt, and a rivet.

A8. The fastening system of any of paragraphs A1-A7, wherein the elongate shank of the second fastening component has a non-circular perpendicular cross-section.

A9. The fastening system of any of paragraphs A1-A8, wherein the perpendicular cross-section of the elongate shank is approximately equal to the size and shape of the first hole and/or second hole.

A10. The fastening system of any of paragraphs A1-A9, wherein the entire length of the elongate shank has a perpendicular cross-section that is non-circular.

A11. The fastening system of any of paragraphs A1-A9, wherein a first portion of the length of the elongate shank has a perpendicular cross-section that is non-circular.

A11.1. The fastening system of paragraph A11, wherein a second portion of the length of the elongate shank has a second perpendicular cross-section that is circular.

A11.2. The fastening system of any of paragraphs A1-A11.1, wherein the elongate shank comprises a helical threaded portion.

A11.3. The fastening system of paragraph A11.2, wherein the helical threaded portion is located on a/the second portion of the length of the elongate shank, the second portion of the length of the elongate shank having a second perpendicular cross-section that is circular.

A11.4. The fastening system of any of paragraphs A1-A11.3, wherein the elongate shank comprises a plurality of annular rings.

A11.5. The fastening system of any of paragraphs A1-A11.4, wherein a/the first portion of the elongate shank comprises a perpendicular cross-section having a major diameter portion and a minor diameter portion, the major diameter portion having a major diameter, the minor diameter portion having a minor diameter, and the major diameter being greater than the minor diameter, wherein the major diameter portion is threaded.

A12. The fastening system of any of paragraphs A1-A11.5, further comprising a third fastening component, the third fastening component being configured to be positioned with respect to the first fastening component and the second fastening component such that the third fastening component substantially prevents movement of the second fastening component with respect to the first fastening component in an axial direction.

A12.1. The fastening system of paragraph A12, wherein the third fastening component includes a third hole extending there through.

A12.2. The fastening system of paragraph A12.1, wherein the third hole is approximately the same size and shape as the first hole and/or the second hole.

A12.3. The fastening system of paragraph A12.1, wherein the third hole is circular.

A12.4. The fastening system of any of paragraphs A12.1-A12.3, wherein the third fastening component is configured to be positioned with respect to the second fastening component such that the elongate shank is inserted through the third hole of the third fastening component.

A12.5. The fastening system of any of paragraphs A12.1-A12.2 or A12.4, wherein the third hole is non-circular.

A12.6. The fastening system of paragraph A12.5, wherein the third hole is elliptical or oval.

A12.7. The fastening system of any of paragraphs A12-A12.6, wherein the third fastening component comprises a nut or a retaining collar.

A12.8. The fastening system of any of paragraphs A12-A12.7, wherein the third fastening component comprises a two-piece nut or a hinged nut.

A13. The fastening system of any of paragraphs A1-A12.8, wherein the second fastening component comprises a first end, a second end opposite the first end, and a head portion positioned adjacent the first end such that an upper surface of the head portion forms the first end of the second fastening component, the head portion having a lower surface opposite the upper surface, wherein the elongate shank extends from the lower surface of the head portion to the second end of the second fastening component.

A14. The fastening system of paragraph A13, wherein the head portion has a square or hexagonal cross-section.

A15. The fastening system of any of paragraphs A12-A12.8 and any of paragraphs A13-A14, wherein the first fastening component has an inner surface and an outer surface, the second hole extending from the inner surface to the outer surface, wherein the first fastening component is positioned such that the inner surface faces the structure, wherein the second fastening component is inserted through the second hole such that the lower surface of the head portion engages with the outer surface of the first fastening component, and wherein the third fastening component is positioned such that it engages the elongate shank and the structure.

A16. The fastening system of paragraph A15, wherein the first fastening component is a bracket or clip, wherein the second fastening component is a bolt, and wherein the third fastening component is a nut.

B1. A system comprising:
the fastening system of any of paragraphs A1-A16; and
the structure.

B2. The system of paragraph B1, wherein the structure is part of an aircraft.

B3. The system of any of paragraphs B1-B2, wherein the structure comprises a composite material, wherein the first hole is formed in the composite material.

B4. The system of any of paragraphs B1-B3, wherein the structure comprises a non-pliable material, wherein the first hole is formed in the non-pliable material.

B5. The system of any of paragraphs B1-B4, wherein the structure comprises a metallic material, and wherein the first hole is formed in the metallic material.

B6. The system of any of paragraphs B1-B5, wherein the first hole is formed through a thickness of the structure, wherein the thickness is at least 5 mm, at least 10 mm, at least 15 mm, at least 20 mm, and/or at least 25 mm.

B7. The system of any of paragraphs B1-B6, wherein the structure is configured to be subject to fatigue loading.

B8. The system of any of paragraphs B1-B7, wherein the structure is a first structure, wherein the system comprises a second structure, and wherein the fastening system is configured to couple the first structure to the second structure and prevent rotation of the first structure with respect to the second structure, about the axis of the second fastening component.

C1. An aircraft including the fastening system of any of paragraphs A1-A16.

D1. A method of installing a non-cylindrical fastening system, the method comprising:
providing the fastening system of any of paragraphs A1-A16;
positioning the first fastening component with respect to the structure such that the first hole is aligned with the second hole; and
inserting the elongate shank of the second fastening component into the first hole and the second hole, thereby coupling the first fastening component to the structure and substantially preventing rotation of the first fastening component with respect to the structure.

D2. The method of paragraph D1, further comprising positioning the first fastening component such that the second hole of the first fastening component is sandwiched between the first hole of the structure and a/the head portion of the elongate shank, and wherein inserting the elongate shank of the second fastening component comprises inserting the elongate shank such that the head portion contacts the first fastening component.

D3. The method of any of paragraphs D1-D2, wherein the providing the fastening system of any of paragraphs A1-A16 comprises providing a plurality of fastening systems, each of the plurality of fastening systems being a fastening system of any of paragraphs A1-A16.

D4. The method of paragraph D3, wherein the structure comprises a plurality of first holes, and wherein the positioning the first fastening component with respect to the structure such that the first hole is aligned with the second hole comprises positioning each respective first fastening component of each of the plurality of fastening systems such that each respective second hole is aligned with a respective first hole of the structure.

D5. The method of paragraph D4, wherein the inserting the elongate shank of the second fastening component into the first hole and the second hole comprises inserting each respective elongate shank of each of the plurality of fastening systems into a respective first hole and a respective second hole.

D6. The method of any of paragraphs D1-D5, further comprising installing a/the third fastening component onto the elongate shank, thereby substantially preventing axial movement of the second fastening component with respect to the structure and the first fastening component.

D7. The method of paragraph D6, wherein the installing the third fastening component onto the elongate shank comprises swaging the third fastening component onto the elongate shank.

D8. The method of paragraph D6, wherein the installing the third fastening component onto the elongate shank comprises threading the third fastening component onto the elongate shank.

D9. The method of paragraph D6, wherein the installing the third fastening component onto the elongate shank comprises closing the third fastening component onto the elongate shank.

D10. The method of any of paragraphs D6-D9, wherein the installing the third fastening component onto the elongate shank comprises installing the third fastening component such that the third fastening component contacts the structure and the elongate shank.

E1. Use of the fastening system of any of paragraphs A1-A16 in construction of an aircraft.

F1. Use of the fastening system of any of paragraphs A1-A16 to prevent rotation of the first fastening component with respect to the structure.

G1. A fastening system configured to couple a first structure to a second structure, the first structure having a first hole formed therein and the second structure having a second hole formed therein, the fastening system comprising:

a fastening component having an elongate shank, the elongate shank having a length extending from a first shank end to a second shank end, the elongate shank being sized and shaped to be inserted through the first hole and the second hole, thereby securing the first structure to the second structure such that the first structure is substantially not rotatable with respect to the second structure, wherein the first hole and the second hole are not circular, and wherein a perpendicular cross-section of the elongate shank is non-circular along at least a portion of the length of the elongate shank.

G2. The fastening system of paragraph G1, wherein the first hole and the second hole are elliptical.

G3. The fastening system of paragraph G1, wherein the first hole and the second hole are oval.

G4. The fastening system of any of paragraphs G1-G3, wherein the first hole and the second hole are substantially identical in size and shape.

G5. The fastening system of any of paragraphs G1-G4, wherein the first structure is configured to be positioned relative to the second structure such that the first hole and the second hole are aligned with one another.

G6. The fastening system of any of paragraphs G1-G5, wherein the first structure is one or more of a bracket, a clip, an angle bracket, a standoff, a stringer clip, a radius filler, a radius enhancement, a radius block, a mounting device, and/or an angled filler.

G7. The fastening system of any of paragraphs G1-G6, wherein the fastening component is one or more of a bolt, a pin, a screw, a lockbolt, and a rivet.

G8. The fastening system of any of paragraphs G1-G7, wherein the perpendicular cross-section of the elongate shank is approximately equal to the size and shape of the first hole and/or the second hole.

G9. The fastening system of any of paragraphs G1-G8, wherein the entire length of the elongate shank has a perpendicular cross-section that is non-circular.

G10. The fastening system of any of paragraphs G1-G9, wherein the elongate shank comprises a first portion and a second portion, the first portion being arranged adjacent the second portion along the length of the elongate shank, wherein the first portion has a first perpendicular cross-section that is non-circular, and wherein the second portion has a second perpendicular cross-section that is circular.

G10.1. The fastening system of paragraph G10, wherein the first portion is positioned adjacent the first shank end and the second portion is positioned adjacent the second shank end.

G11. The fastening system of any of paragraphs G1-G10.1, wherein the elongate shank comprises a helical threaded portion.

G12. The fastening system of paragraph G11, wherein the helical threaded portion is located on a/the second portion of the length of the elongate shank, the second portion of the length of the elongate shank having a/the second perpendicular cross-section that is circular.

G13. The fastening system of any of paragraphs G1-G12, wherein the elongate shank comprises a plurality of annular rings.

G14. The fastening system of any of paragraphs G1-G13, wherein a/the first portion of the elongate shank comprises a perpendicular cross-section having a major diameter portion and a minor diameter portion, the major diameter portion having a major diameter, the minor diameter portion having a minor diameter, and the major diameter being greater than the minor diameter, wherein the major diameter portion is threaded.

G15. The fastening system of any of paragraphs G1-G14, further comprising a retaining device, the retaining device being configured to be positioned with respect to the fastening component, first structure, and second structure such that the retaining device substantially prevents movement of the elongate shank with respect to the first structure and the second structure in an axial direction.

G16. The fastening system of paragraph G15, wherein the retaining device includes a third hole extending there through.

G17. The fastening system of paragraph G16, wherein the third hole is circular.

G18. The fastening system of paragraph G16, wherein the third hole is approximately the same size and shape as the first hole and/or the second hole.

G19. The fastening system of any of paragraphs G16-G18, wherein the retaining device is configured to be positioned with respect to the fastening component such that the elongate shank is inserted through the third hole of the retaining device.

G20. The fastening system of any of paragraphs G16 or G18-G19, wherein the third hole is non-circular.

G21. The fastening system of paragraph G20, wherein the third hole is elliptical or oval.

G22. The fastening system of any of paragraphs G15-G21, wherein the retaining device comprises a nut or a retaining collar.

G23. The fastening system of any of paragraphs G15-G22, wherein the retaining device comprises a two-piece nut or a hinged nut.

G24. The fastening system of any of paragraphs G1-G23, wherein the fastening component comprises a head portion positioned adjacent the first shank end, the head portion comprising an upper surface and a lower surface opposite the upper surface, wherein the elongate shank extends from the lower surface of the head portion to the second shank end.

G25. The fastening system of any of paragraphs G15-G23 and paragraph G24, wherein the first structure has an inner surface and an outer surface, the second hole extending from the inner surface to the outer surface, wherein the fastening component is positioned such that the inner surface faces the second structure, wherein the fastening component is inserted through the first hole and the second hole such that the lower surface of the head portion engages with the outer surface of the first structure, and wherein the retaining device is positioned such that it engages the elongate shank and the second structure.

G26. The fastening system of paragraphs G25 and G10, wherein the retaining device is configured to engage with the second portion of the elongate shank.

G27. The fastening system of paragraph G26, wherein the retaining device and the elongate shank are configured such that the retaining device is threaded onto the second portion of the elongate shank.

H1. Use of the fastening system of any of paragraphs G1-G27 in construction of an aircraft.

I1. Use of the fastening system of any of paragraphs G1-G27 to prevent rotation of the first structure with respect to the second structure.

J1. An aircraft including the fastening system of any of paragraphs G1-G27.

K1. Use of the fastening system of any of paragraphs A1-A16 or G1-G27 to reduce fastener quantities required in manufacturing an apparatus.

L1. Use of the fastening system of any of paragraphs A1-A16 or G1-G27 to reduce hole quantities required in manufacturing an apparatus.

M1. A method of coupling a first structure to a second structure, the method comprising:

providing the fastening system of any of paragraphs G1-G27; and inserting the elongate shank through the first hole and the second hole, thereby coupling the first structure to the second structure and substantially preventing rotation of the first structure with respect to the second structure about a longitudinal axis of the elongate shank, the longitudinal axis being oriented along the length of the elongate shank.

M2. The method of paragraph M1, further comprising positioning the first structure with respect to the second structure such that the first hole is aligned with the second hole.

M3. The method of any of paragraphs M1-M2, further comprising positioning the first structure such that the first hole of the first structure is sandwiched between the second hole of the second structure and a/the head portion of the elongate shank, and wherein the inserting the elongate shank comprises inserting the elongate shank such that the head portion contacts the first structure.

M4. The method of any of paragraphs M1-M3, wherein the providing the fastening system of any of paragraphs G1-G27 comprises providing a plurality of fastening systems, each of the plurality of fastening systems being a fastening system of any of paragraphs G1-G27.

M5. The method of paragraph M4, wherein the second structure comprises a plurality of second holes, and the first structure comprises a plurality of first structures, and wherein the inserting the elongate shank comprises inserting each respective elongate shank of the plurality of fastening systems into a respective first hole of a respective first structure of the plurality of first structures and into a respective second hole of the plurality of second holes of the second structure, thereby coupling a plurality of first structures to the second structure, wherein each respective first structure is substantially prevented from rotating with respect to the second structure, about the axis of the respective elongate shank.

M6. The method of any of paragraphs M1-M5, further comprising installing a/the retaining device onto the elongate shank, thereby substantially preventing axial movement of the fastening component with respect to the first structure and the second structure.

M7. The method of paragraph M6, wherein the installing the retaining device onto the elongate shank comprises swaging the retaining device onto the elongate shank.

M8. The method of paragraph M6, wherein the installing the retaining device onto the elongate shank comprises threading the retaining device onto the elongate shank.

M9. The method of paragraph M6, wherein the installing the retaining device onto the elongate shank comprises closing the retaining device onto the elongate shank.

M10. The method of any of paragraphs M6-M9, wherein the installing the retaining device onto the elongate shank comprises installing the retaining device such that the retaining device contacts the second structure and the elongate shank.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A fastening system configured to couple a first structure to a second structure, the first structure having a first hole formed therein and the second structure having a second hole formed therein, the fastening system comprising:
a fastening component having an elongate shank, the elongate shank having a length extending from a first shank end to a second shank end, the elongate shank being sized and shaped to be inserted through the first hole and the second hole, thereby securing the first structure to the second structure and substantially preventing the first structure from rotating with respect to the second structure, wherein the first hole and the second hole are not circular, and wherein a first perpendicular cross-section of the elongate shank is elliptical along at least a first portion of the length of the elongate shank, wherein the first portion comprises a major diameter portion and a minor diameter portion, the major diameter portion having a major diameter, the minor diameter portion having a minor diameter, wherein the major diameter is greater than the minor diameter, wherein the major diameter portion is threaded, and wherein the minor diameter portion is unthreaded.

2. The fastening system according to claim 1, wherein the fastening component is one or more of a bolt, a pin, a screw, a lockbolt, and a rivet.

3. The fastening system according to claim 1, wherein the first perpendicular cross-section of the elongate shank is approximately equal to the size and shape of the first hole and the second hole.

4. The fastening system according to claim 1, further comprising a retaining device, the retaining device being configured to be positioned with respect to the fastening component, first structure, and second structure such that the retaining device substantially prevents movement of the elongate shank with respect to the first structure and the second structure in an axial direction.

5. The fastening system according to claim 4, wherein the retaining device comprises one or more of a nut, a retaining collar, a two-piece nut, and a hinged nut.

6. The fastening system according to claim 1, wherein the first portion extends along only a portion of the length of the elongate shank.

7. A fastening system configured to be coupled to a structure having a first hole formed therein, the fastening system comprising:
a first fastening component having a second hole formed therethrough, wherein the first fastening component is configured to be positioned relative to the structure such that the first hole and the second hole are aligned with one another, wherein the first fastening component is asymmetrical and configured for use on an aircraft, wherein the first fastening component is configured to receive a device for a load-bearing application, and wherein the first hole and the second hole are substantially identical to each other in size and shape; and
a second fastening component having an elongate shank, the elongate shank having a longitudinal axis and being sized and shaped to be inserted through the second hole in the first fastening component and into the first hole in the structure, thereby securing the first fastening component to the structure using a single second fastening component, such that the first fastening component is substantially prevented from rotating with respect to the structure about the longitudinal axis of the elongate shank when the device is loaded in the load-bearing application, wherein the first hole and the second hole are non-circular and non-polygonal, wherein the elongate shank of the second fastening component comprises a non-circular portion extending along at least a portion of the elongate shank, and wherein the non-circular portion has a first perpendicular cross-section that is non-polygonal.

8. The fastening system according to claim 7, wherein the first hole and the second hole are elliptical, and wherein the first perpendicular cross-section of the non-circular portion of the elongate shank is elliptical.

9. The fastening system according to claim 7, wherein the first fastening component comprises a single projecting flange extending from a central insert portion, wherein the central insert portion is configured to receive the device for a load-bearing application, wherein the second hole is positioned through the single projecting flange, and wherein the second fastening component comprises one or more of a bolt, a lockbolt, a pin, a screw, and a rivet.

10. The fastening system according to claim 7, wherein the non-circular portion of the elongate shank is a first portion of the elongate shank, and wherein the elongate shank comprises a second portion, the second portion having a second perpendicular cross-section that is circular.

11. The fastening system according to claim 10, wherein the elongate shank comprises a helical threaded portion, and wherein the helical threaded portion is located on the second portion of a length of the elongate shank.

12. The fastening system according to claim 7, further comprising a third fastening component, the third fastening component being configured to be positioned with respect to the first fastening component and the second fastening component such that the third fastening component substantially prevents movement of the second fastening component with respect to the first fastening component in an axial direction.

13. The fastening system according to claim 12, wherein the second fastening component comprises an annular ring engaged with the elongate shank within the non-circular portion of the elongate shank, wherein the third fastening component is configured to engage the annular ring to substantially prevent movement of the second fastening component with respect to the first fastening component in the axial direction.

14. The fastening system according to claim 7, further comprising the structure, wherein the structure is part of the aircraft.

15. The fastening system according to claim 14, wherein the structure comprises a plurality of first holes formed therein, wherein the first fastening component comprises a plurality of first fastening components each having a respective second hole formed therethrough, wherein the second fastening component comprises a plurality of second fastening components each having a respective elongate shank, wherein a single respective second fastening component is configured to secure a respective first fastening component to the structure by inserting each respective elongate shank into each respective first hole and respective second hole wherein the first fastening component is positioned adjacent the structure such that each respective first hole is aligned with a respective second hole, thereby substantially preventing rotation of each respective first fastening component with respect to the structure about the respective axis of each respective elongate shank.

16. The fastening system according to claim 7, wherein the first fastening component comprises a vertical insert, a self-locking insert, an axial insert, or a standoff configured for use on an aircraft.

17. A fastening system configured to be coupled to a structure having a first hole formed therethrough, the fastening system comprising:
    a first fastening component having a second hole formed therethrough, wherein the first fastening component is configured to be positioned relative to the structure such that the first hole and the second hole are aligned with one another, wherein the first fastening component is asymmetrical and configured for use on an aircraft, wherein the first fastening component is configured to receive a device for a load-bearing application, wherein the first hole and the second hole are elliptical, and wherein the first hole and the second hole are substantially identical to each other in size and shape; and
    a second fastening component having an elongate shank, the elongate shank having a longitudinal axis and being sized and shaped to be inserted through the second hole in the first fastening component and into the first hole in the structure, thereby securing the first fastening component to the structure using a single second fastening component, such that the first fastening component is substantially prevented from rotating with respect to the structure about the longitudinal axis of the elongate shank when the device is loaded in the load-bearing application, wherein the first hole and the second hole are non-circular, wherein the elongate shank of the second fastening component comprises a non-circular portion extending along at least a portion of the elongate shank, and wherein the non-circular portion has a first perpendicular cross-section that is elliptical, wherein the first perpendicular cross-section of the non-circular portion of the elongate shank comprises a major diameter portion and a minor diameter portion, the major diameter portion having a major diameter, the minor diameter portion having a minor diameter, the major diameter being greater than the minor diameter, wherein the major diameter portion is threaded, and wherein the minor diameter portion is unthreaded.

18. A method of coupling a first structure to a second structure, the method comprising:
    providing a fastening system, the fastening system comprising:
        a fastening component having an elongate shank, the elongate shank having a length extending from a first shank end to a second shank end, the elongate shank being sized and shaped to be inserted through a first hole formed in the first structure and a second hole formed in the second structure, wherein the first hole and the second hole are not circular, wherein the first hole and the second hole are substantially identical in size and shape, and wherein a first perpendicular cross-section of the elongate shank is non-circular and non-polygonal along at least a first portion of the length of the elongate shank; and
        the first structure, wherein the first structure is asymmetrical and configured to receive a device for a load-bearing application; and
    inserting the elongate shank through the first hole and the second hole such that the first portion of the elongate shank engages the first hole and the second hole, thereby coupling the first structure to the second structure via a single fastening component and substantially preventing rotation of the first structure with respect to the second structure about a longitudinal axis of the elongate shank when the device is loaded in the load-bearing application, wherein the longitudinal axis is oriented along the length of the elongate shank, and wherein the first structure comprises one or more of a vertical insert, a self-locking insert, an axial insert, and a standoff configured for use on an aircraft.

19. The method according to claim 18, wherein the providing the fastening system comprises providing a plurality of fastening systems, wherein the second structure is a second structure of the aircraft and comprises a plurality of second holes formed therein, and the first structure comprises a plurality of first structures, and wherein the inserting the elongate shank comprises inserting each respective elongate shank of the plurality of fastening systems into a respective first hole of a respective first structure of the plurality of first structures and into a respective second hole of the plurality of second holes of the second structure of the aircraft, thereby coupling the plurality of first structures to the second structure of the aircraft, wherein each respective first structure is substantially prevented from rotating with respect to the second structure of the aircraft, about the longitudinal axis of the respective elongate shank.

20. The method according to claim 19, further comprising installing a respective retaining device onto each respective elongate shank, thereby substantially preventing axial movement of each respective fastening component with respect to the first structure and the second structure of the aircraft.

* * * * *